United States Patent
Ramaswamy et al.

(10) Patent No.: US 6,888,840 B1
(45) Date of Patent: May 3, 2005

(54) OUTPUT SYMBOL RATE CONTROL IN A PACKET TRANSPORT RATE CONVERSION SYSTEM

(75) Inventors: Kumar Ramaswamy, Indianapolis, IN (US); Paul Gothard Knutson, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/396,228

(22) Filed: Sep. 15, 1999

Related U.S. Application Data

(60) Provisional application No. 60/102,873, filed on Oct. 2, 1998.

(51) Int. Cl.[7] .............................................. H04L 12/28
(52) U.S. Cl. ........................ 370/412; 370/487; 370/535
(58) Field of Search ................................ 370/412–413, 370/428–429, 485–488, 537, 414, 468, 503, 505, 506, 522, 528, 391, 474, 378, 265, 395.64, 509, 516, 352–356; 348/419.1, 423, 569, 497; 345/716; 365/221; 341/61; 375/371, 376

(56) References Cited

U.S. PATENT DOCUMENTS

| | | | | |
|---|---|---|---|---|
| 5,323,426 A | * | 6/1994 | James et al. ................. | 365/221 |
| 5,365,519 A | * | 11/1994 | Kozaki et al. ............... | 370/378 |
| 5,566,174 A | * | 10/1996 | Sato et al. ................... | 370/391 |
| 5,581,585 A | | 12/1996 | Takatori et al. ............. | 375/376 |
| 5,671,253 A | | 9/1997 | Stewart ....................... | 375/316 |
| 5,734,589 A | * | 3/1998 | Kostreski et al. ........... | 345/716 |
| 5,825,778 A | | 10/1998 | Hauge ......................... | 370/473 |
| 5,969,770 A | * | 10/1999 | Horton ........................ | 348/569 |
| 6,169,747 B1 | * | 1/2001 | Sartain et al. ............... | 341/61 |
| 6,229,863 B1 | * | 5/2001 | Rude .......................... | 370/505 |

FOREIGN PATENT DOCUMENTS

| | | | | |
|---|---|---|---|---|
| WO | 98/13929 | 4/1998 | ............ | H03D/1/06 |

OTHER PUBLICATIONS

Moonky Lee et al., *Revised Record/Playback Interface Systems for GA–HDTV, HD–VCR and D3 VTR*, IEEE Transactions on Consumer Electronics, vol. 42, No. 1, Feb. 1996, pp. 128–131.

U.S. Appl. No. 09/187,318, filed Oct. 2, 1998, Knutson et al.

* cited by examiner

*Primary Examiner*—Frank Duong
*Assistant Examiner*—Melanie Jagannathan
(74) *Attorney, Agent, or Firm*—Joseph S. Tripoli; Joseph J. Laks; Ronald H. Kurdyla

(57) ABSTRACT

A remodulator system includes a source of an input transport packet stream and an input packet buffer coupled to the input transport packet stream source. The input packet buffer generates a status signal indicating whether it is: full, empty, or neither empty nor full. An output packet stream generator is coupled to the input packet stream buffer and responsive to an output clock signal, and generates the output packet stream in synchronism with the output clock signal. A variable output clock signal generator generates the output clock signal responsive to a control signal, and a control signal generator generates the control signal in response to the status signal.

11 Claims, 4 Drawing Sheets

OUTPUT SYMBOL RATE CONTROL IN A PACKET TRANSPORT RATE CONVERSION SYSTEM

This is a non-provisional application of provisional application Ser. No. 60/102,873 by Paul G. Knutson et al., filed Oct. 2, 1998.

The present invention relates to a system for controlling the symbol rate of an output packet stream in a system for converting a packet transport stream from one bit rate to another bit rate.

Information is increasingly being transmitted digitally, and digital information may be transmitted in the form of a stream of packets carrying the information. For example, current digital television signals are transmitted by packet streams. The packet streams are encoded and modulated onto carriers using differing modulation schemes. For example, packet streams carrying terrestrial digital television signals in the United States are modulated using 8 level vestigial sideband modulation using trellis encoding (8VSB-t). Packet streams carrying digital cable television signals in the United States are modulated using 64 level or 256 level quadrature amplitude modulation (64QAM or 256QAM) or 16 level vestigial sideband modulation (16VSB). Packet streams carrying satellite television signals are modulated using quadrature phase modulation (QPSK). Each packet stream is specially encoded for the modulation it will receive, resulting in different bit rates for the respectively modulated packetized bit streams, ranging from around 19 megabits per second (Mbps) for 8VSB-t to around 39 Mbps for 16VSB and 256QAM. The nominal values for these bit rates are set by industry standards.

It is sometimes required to convert from one modulation format to another. For example, a digital television receiver may properly receive, decode and display only 16VSB or 8VSB-t modulated digital packet streams. But digital video cassette recorders (DVCR) and/or cable and satellite set top box receivers may properly receive and process one or more of cable (64QAM, 256QAM, 16VSB) or satellite (QPSK) modulated digital packet streams. In order for the DVCR and cable or satellite set top boxes to properly operate with such a digital television, they must remodulate the received signal in the modulation recognized by the television receiver (16VSB or 8VSB-t).

However, as described above, the received and remodulated packet streams are encoded into bit streams at different bit rates for the different modulation techniques. The bit rates of the different packet streams are not necessarily in a simple integer ratio with each other. For this reason, it is not always practical or even possible to generate an output clock signal frequency-locked to the input clock signal. Thus, in existing remodulation systems, an input clock signal is generated frequency-locked to the transmitter clock. The input clock is used to control the timing of the reception of the input packets. An oscillator in the remodulator generates an output clock signal at the industry specified frequency for the desired modulation of the output packet stream. The output clock signal oscillator is generally a crystal oscillator nominally at the specified output frequency.

It is also well known that there is sometimes a difference between the nominal frequency specified for the bit rate of the packet stream and the actual frequency of the clock signal used to generate the packet. This may be due to inherent inaccuracies in the design and implementation of the clock signal oscillator, and/or to drift in the clock signal frequency due to varying oscillator component characteristics over time. Thus, both the input clock and the output clock may not be exactly at the industry-specified frequency for the modulation it is being used to process. If the input clock signal becomes relatively faster than the output clock signal, then packets arrive at the remodulator faster than they are retransmitted. If, on the other hand, the input clock signal becomes relatively slower than the output clock signal, then packets are retransmitted faster than they arrive.

Prior systems provide decoders to completely decode the received packet stream and extract the component signals (i.e. video, audio, data, etc.). Timing for reception of the packet stream is maintained by the input clock, synchronized to the transmitter clock. These component signals are then recoded and remodulated in the desired modulation format. The timing of the transmitted signal is provided by the output clock signal from an oscillator in the remodulator having the desired frequency for the modulation being used for remodulation of the packet stream. The remodulated signal is then supplied to the, e.g. television receiver. However, such a system requires a full demodulator, decoder, encoder and modulator. This is expensive, especially because there is no processing performed on the component signals in the packet stream.

A system which can remodulate a received packet stream signal without requiring complete demodulation, decoding, encoding and remodulation of the component signals and which can maintain proper packet timing is desirable.

In accordance with principles of the present invention, a remodulator system includes a source of an input transport packet stream and an input packet buffer coupled to the input transport packet stream source. The input packet buffer generates a status signal indicating whether it is: full, empty, or neither empty nor full. An output packet stream generator is coupled to the input packet stream buffer and responsive to an output clock signal, and generates the output packet stream in synchronism with the output clock signal. A variable output clock signal generator generates the output clock signal responsive to a control signal, and a control signal generator generates the control signal in response to the status signal.

Such a system can operate successfully when the bit rate of the input signal varies from the industry specified nominal frequency. If the frequency of the input clock signal drifts to be relatively higher, then packets are received faster than they are produced, and they gradually build up in the input packet buffer. The input buffer eventually becomes full, and the output clock frequency is adjusted higher in frequency. If the frequency of the input clock signal drifts to be relatively lower, then packets are produced faster than they are received. The input packet buffer eventually becomes empty, and the output clock frequency is adjusted lower in frequency.

Figure 1:
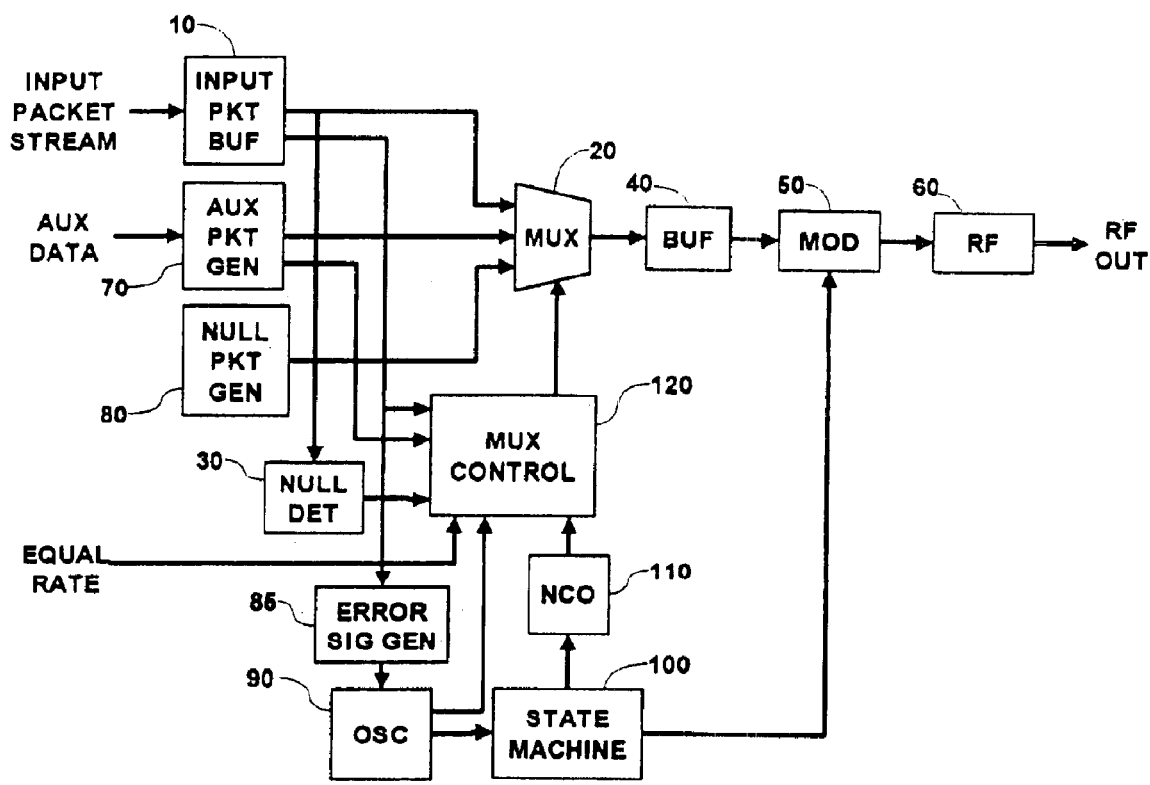
FIG. 1 is a block diagram of a portion of a remodulation system according to the present invention.

FIG. 1 is a block diagram of a portion of a remodulator system according to the present invention. In the illustrated embodiment, the remodulator is a part of a digital video cassette recorder in which digital signals representing a received packet stream in one format are recorded and then retrieved, and reformatted into a packet stream in another format. However, one skilled in the art will understand that such a remodulator system will find use in any system, such as a digital set top box, where the format of a packet stream must be changed.

Only those elements necessary for understanding the present invention are illustrated in FIG. 1. Other elements and interconnections among the elements are necessary in a complete remodulator system. One skilled in the art will understand what other elements are necessary, how to design and implement them, and interconnect them with the illustrated elements. One skilled in the art will also understand that other connections, such as status, control and clock signals exist among the illustrated elements but are not illustrated in order to simplify the drawing.

In FIG. 1, a source (not shown) of an input transport packet stream is coupled to an input terminal of an input packet buffer 10. The input transport packet stream source may be, for example, a playback circuit of a digital video cassette recorder or a set top box. The input transport packet stream source produces a digital signal carrying the transport packets, and an input clock signal synchronized to the input transport packets, in a known manner and supplies them both to the input packet buffer 10. A data output terminal of the input packet buffer 10 is coupled to a first data input terminal of a multiplexer (MUX) 20 and an input terminal of a null packet detector 30. An output terminal of the MUX 20 is coupled to an input terminal of a remodulation packet buffer 40. And output terminal of the remodulation packet buffer 40 is coupled to an input terminal of a modulator 50. An output terminal of the modulator 50 is coupled to an input terminal of an RF upconverter 60. An output terminal of the RF upconverter generates an RF signal at a predetermined frequency (e.g. channel 3) for reception by, for example, a digital television receiver (not shown).

A source of auxiliary data (not shown), which may be an on-screen display generator, is coupled to an input terminal of an auxiliary packet generator 70. A data output terminal of the auxiliary packet generator 70 is coupled to a second data input terminal of the multiplexer 20. An output terminal of a null packet generator 80 is coupled to a third data input terminal of the multiplexer 20.

An oscillator 90, which may be a voltage controlled crystal oscillator (VCXO), has a first output terminal coupled to an input terminal of a state machine 100 and a second input terminal, carrying a packet clock signal, coupled to a clock input terminal of a multiplexer controller 120. The state machine generates control signals for controlling the operation of the remodulation system illustrated in FIG. 1, not all of which are shown, in order to simplify the figure. A first control output terminal is coupled to the modulator 50, and a second control output terminal is coupled to an input terminal of a numerically controlled oscillator (NCO) 110.

The multiplexer controller 120 controls the operation of the MUX 20, in response to a plurality of control signals. A status output terminal from the input packet buffer 10 is coupled to a first input terminal of the multiplexer controller 120 and to an input terminal of an error signal generator 85. An output terminal of the error signal generator 85 is coupled to a control input terminal of the oscillator 90. A status output terminal from the auxiliary packet buffer 70 is coupled to a second input terminal of the multiplexer controller 120. An output terminal of the null detector 30 is coupled to a third input terminal of the multiplexer controller 120. A source of a signal indicating whether the bit rate of the input signal is substantially equal to the bit rate of the output signal is coupled to a fourth input terminal of the multiplexer controller 120. An output terminal of the NCO 110 is coupled to a fifth input terminal of the multiplexer controller 120. An output terminal of the multiplexer controller 120 is coupled to a control input terminal of the multiplexer 20.

Figure 2:
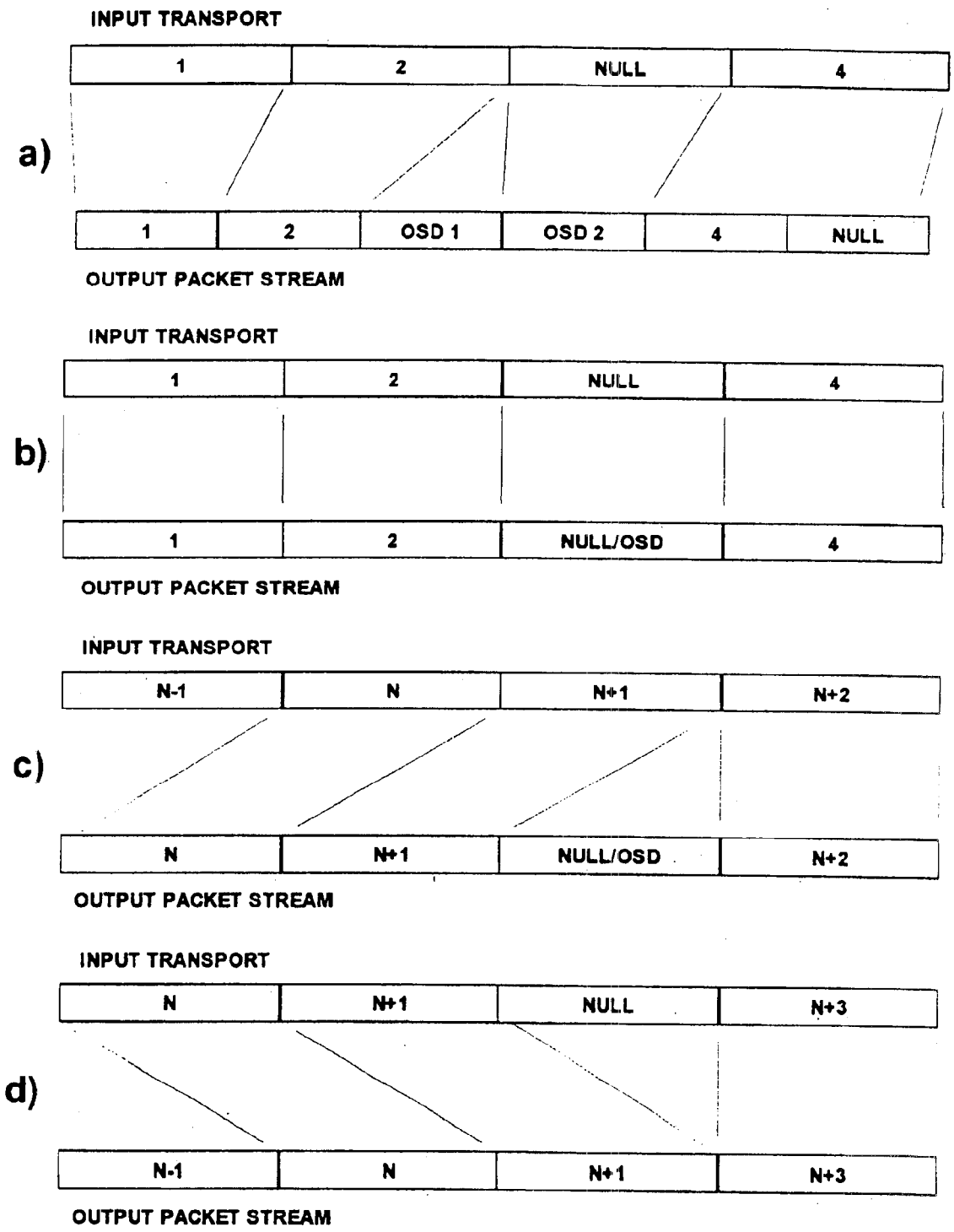
FIG. 2 is a timing diagram useful in understanding the operation of the system illustrated in FIG. 1.

FIG. 2 is a timing diagram useful in understanding the operation of the remodulator system illustrated in FIG. 1. In FIG. 2, time is illustrated in the horizontal direction, and respective packets in different packet streams are illustrated by different horizontal lines of rectangles. The time duration of each packet is represented by the horizontal size of the rectangle and temporal location of each packet is represented by the horizontal location of the rectangle. In each of FIGS. 2a through 2d, an upper line represents the input transport packet stream and a lower line represents the corresponding output packet stream.

In general, the remodulator of FIG. 1 operates to convert an input transport packet stream in one format into a modulated output packet stream in another format. The bit rate of the output packet stream is preferably greater than or equal to the bit rate of the input transport packet stream. It is possible to generate an output packet stream having a lower bit rate than that of the input transport packet stream only if the input transport packet stream has sufficient null packets that they can be removed to generate the output packet stream at the desired bit rate. If the bit rate of the output packet stream is equal to that of the input transport packet stream, the input transport packet stream must contain sufficient null packets to prevent buffer overflow, as described below.

When the bit rate of the output packet stream is greater than that of the input transport packet stream, additional packets are inserted into the output packet stream to generate the desired bit rate. This situation is illustrated in FIG. 2a. In FIG. 2a, the bit rate of the input transport packet stream is approximately, but not exactly, $2/3$ of that of the output packet stream. Though illustrated as approximately $2/3$, one skilled in the art will understand from the following description, that there need be no simple integer relationship between the respective bit rates of the input transport packet stream and the output packet stream.

In FIG. 2a, there are approximately three packets in the output packet stream in the time required for two packets in the input transport packet stream; or, put another way, each packet in the output packet stream takes approximately $2/3$ of the time required by a packet in the input transport packet stream. Additional packets are inserted into the output packet stream at times selected to maintain the original temporal locations of the input transport packets to the extent possible, as described in more detail below. These additional packets are auxiliary packets containing auxiliary data (such as OSD data) if a packet of such auxiliary data is available. For example, in FIG. 2a, two input transport packets, 1 and 2 are inserted into the output packet stream as output packets 1 and 2. Then an additional packet is inserted into the output packet stream in order to temporally align the next input transport packet. In this case, it is assumed that an auxiliary (OSD) packet is available. Thus, an OSD packet, OSD 1, is next inserted into the output packet stream. If an auxiliary data packet is not available, then the additional packet is a null packet. This is illustrated after input transport packet 4. Because it is assumed no OSD packet is available at this time, a null packet is inserted into the output packet stream as the additional packet. One skilled in the art will understand that the sum of the bit rates of the input transport packet stream and the auxiliary data packet stream must be less than or equal to the bit rate of the output packet stream.

As described above, the input transport packet stream sometimes includes a null packet. When a null packet in the input transport data stream is detected, it may be either deleted, passed through to the modulator or replaced by an auxiliary data packet. If the bit rate of the output packet stream is greater than that of the input transport packet stream (FIG. 2a), then the presence of null packets may be ignored, and null packets may be treated as any other input transport packet to be inserted into the output packet stream. Alternatively, null packets may be detected and replaced by auxiliary data packets. This is illustrated in FIG. 2a in which a null packet (in the place of input transport packet 3) in the input transport packet stream is replaced by an OSD packet, OSD 2, in the output packet stream. The null packet could also have been inserted directly into the output packet stream, as described above.

The situation where the bit rate of the input transport packet stream is substantially equal to that of the output packet stream is illustrated in FIGS. 2b through 2d. In general, when the bit rates are equal, packets in the input transport packet stream are inserted directly into the output packet stream, as illustrated in FIG. 2b. Also, in general, if the input packet stream contains a null packet, either that null packet is inserted into the output packet stream, or it is replaced with an auxiliary data packet. This is illustrated in FIG. 2b in which a null packet (inserted for input transport packet 3) is inserted into the output packet stream, or replaced with an OSD packet, if one is available.

If the bit rate of the output packet stream is slightly slower than that of the input transport packet stream, as described above, then, input transport packets arrive slightly faster than output packets depart. In this case, input transport packets slowly accumulate in the input packet buffer 10. Eventually, the input transport packet buffer 10 becomes full or nearly full. The input packet buffers 10 conditions its status signal to indicate that it is full or nearly full. In this situation, a null packet in the input transport packet stream is deleted to minimize potential overflow of the input packet buffer. This is illustrated in FIG. 2c, in which a null packet (inserted for input transport packet N+2) is deleted. This enables the output packet stream to become temporally more aligned with the input transport packet stream.

In addition, when the input packet buffer becomes full or nearly full, the error signal generator 85 responds to the status signal from the input packet buffer 10 by conditioning the oscillator 90 to increase the frequency of the output clock signal. The clock signal from the oscillator 90 will increase the bit rate of the output packet stream, and more closely match the bit rate of the input packet stream, minimizing the possibility of an overflow of the input packet buffer 10.

Similarly, if the bit rate of the output packet stream is slightly faster than that of the input transport packet stream, as described above, output packets depart faster than input transport packets arrive. In this case, the input packet buffers 10 eventually runs out of packets. The input packet buffers 10 conditions its status signal to indicate that it is empty. In this situation additional packets, being either null packets or auxiliary data packets, are inserted into the output packet stream, to provide the required bits for the remodulation process. This is illustrated in FIG. 2d, in which an output packet N+2 is required in the output packet stream, but it has not yet been received from the input transport packet stream source. A null or auxiliary data (OSD) packet is inserted into the output packet stream to fill the time for which the N+2 input transport packet is not yet available.

In addition, when the input packet buffer becomes empty, the error signal generator 85 responds to the status signal from the input packet buffer 10 by conditioning the oscillator 90 to decrease the frequency of the output clock signal. The clock signal from the oscillator 90 will decrease the bit rate of the output packet stream, and more closely match the bit rate of the input packet stream, minimizing the possibility of an underflow of the input packet buffer 10.

If, on the other hand, the input transport buffer 10 is neither full or nearly full nor empty, and if a packet of auxiliary data is available, then the null packet in the input transport packet stream is replaced with an additional packet containing auxiliary data if an auxiliary data packet is available, as described above with reference to FIG. 2b. If auxiliary data is not available, then a null packet is inserted into the output packet stream.

More specifically, in operation, the input packet buffer 10 receives input transport packets and time-smooths any data bursts from, and compensates for jitter in, the input transport packet stream source (not shown). The buffered input transport packets are provided to the multiplexer 20 and the null packet detector 30. A status signal from the input packet buffer 10 indicates when the input packet buffer is full or nearly full, is empty, or is otherwise operating in a nominal mode (i.e. neither empty nor full). A status signal from the null packet detector 30 indicates when the next packet in the input packet buffer 10 is a null packet. The auxiliary data packet generator 70 receives auxiliary data (e.g. OSD data) from the system containing the remodulator illustrated in FIG. 1, accumulates the data and forms auxiliary data packets. The auxiliary data packets, when available, are provided to the multiplexer 20. A status signal from the auxiliary data packet generator 70 indicates when an auxiliary data packet is available. The null packet generator 80 continually generates a null packet, and provides the null packet to the multiplexer 20. The equal rate signal provides an indication of whether the bit rate of the output packet stream is substantially equal to that of the input transport packet stream.

In a digital television signal, packets must be present in the packet stream at specific times, or time intervals, in order for time stamps inserted into the packet stream to maintain accurate control of the display of the television program carried by the packet stream. In order to preserve this timing during the remodulation process, input transport packets must be inserted into the output packet stream at substantially the same temporal locations as they were in the input transport packet stream. The additional packets inserted into the packet stream to produce the proper output bit rate must be inserted between the inserted input transport packets. Furthermore, this timing must be maintained despite the fact that the bit rates of the input transport packet stream and the output packet stream are not in a simple integer ratio.

To control this, the combination of the oscillator 90, state machine 100 and numerically controlled oscillator (NCO) 110 produces a bistate control signal having a first state for times when an input transport packet must be inserted into the output packet stream, and a second state at times when an additional packet (either auxiliary or null) must be inserted, in a manner to be described in more detail below. A signal generated in this manner may be controlled to have the appropriate duty cycle for substantially any ratio of bit rates. The "input/additional" signal is supplied to the multiplexer control circuit 120.

The multiplexer control circuit 120 operates in response to these status signals, and to the packet clock signal received from the oscillator 90, to provide a control signal to the MUX 20. In response to this control signal, the MUX 20 operates to selectively couple either an input transport packet, an auxiliary data packet or a null packet to its output terminal, in a manner described in more detail below. The MUX 20, thus generates an output packet stream having a bit rate required by desired the modulation technique. The packet stream from the MUX 20 is buffered by the remodulation packet buffer 40 to smooth out any timing jitter.

The modulator 50 formats the digital packet stream from the remodulation packet buffer 40 in the appropriate manner to produce a data stream at the predetermined modulation bit rate, and modulates the formatted data stream. In the illustrated embodiment, the packet stream is 16VSB modulated, as described above, and has a bit rate of around 39 Mbps. It is possible for the output packet stream to be modulated according to any modulation scheme, for example, either 16VSB or 8VSB. The control signal from the state machine 100 controls the modulation scheme used by the modulator 50, while other control signals control the bit rate of the output packet stream to conform to the selected modulation scheme. The modulated packet stream from the modulator 50 is then upconverted by the RF upconverter 60 to a desired RF frequency, for example, the channel 3 frequency which may be received by a digital television receiver.

Referring now to the operation of the combination of the MUX 20 and the multiplexer controller circuit 120, there are five basic functions which may be performed: 1) insert an input transport packet into the output packet stream; 2) insert a null packet into the output packet stream; 3) insert an auxiliary data packet into the output packet stream; 4) delete a null packet from the input transport packet stream; and 5) replace a null packet in the input transport packet stream with an auxiliary data packet in the output packet stream (which is a combination of 3) and 4)). The function performed is con trolled by the multiplexer control circuit 120 in response to the status signals, as described above.

As described above, the transport/additional status signal from the NCO 110 indicates times when an input transport packet should be placed in the next packet slot in the output packet stream and times when an additional packet (auxiliary or null) should be placed in the next packet slot in the output packet stream. This status signal is always set to "transport" when the bit rate of the input transport packet stream is equal to that of the output packet stream. When the packet clock signal from oscillator 90 indicates the occurrence of the next output packet slot, an input transport packet is inserted into the output packet stream if this status signal indicates that a transport packet is required, and either an auxiliary or null packet is inserted into the output packet stream if this status signal indicates that an additional packet is required.

The null detect signal from the null detector 30 indicates that the next input transport packet in the input packet buffer is a null packet. If the bit rate of the output packet signal is greater than that of the input transport packet stream, then this signal may be ignored, and the null packet treated just as any other packet in the input transport packet stream. If the bit rate of the output packet stream is substantially equal to that of the input transport packet stream, then the null detect signal is processed as follows. If the input packet buffer 10 is full or nearly full, as indicated by its status signal, then the detected null packet is deleted. If the input packet buffer 10 is not full, and an auxiliary data packet is avail able, as indicated by the status signal from the auxiliary packet generator 70, then the auxiliary data packet may be substituted for the null packet. Otherwise the null packet is inserted into the output packet stream.

The auxiliary data available signal from the auxiliary data packet generator 70 indicates that a packet of auxiliary data is available. If the transport/additional status signal indicates that an additional packet is required, and the auxiliary data available signal indicates that an auxiliary data packet is available, then the auxiliary data packet is inserted into the output packet stream. Or if the bit rate of the input transport packet stream bit is substantially equal to that of the output packet stream, the next packet in the input transport packet stream packet is a null packet and the input packet buffer is not full or nearly full, then the auxiliary data packet is inserted into the output packet stream.

The status signal from the input packet buffer 10 indicates whether the input packet buffer 10 is full or nearly full, is empty, or is otherwise operating nominally (i.e. neither full nor empty). If the buffer is full or nearly full, then any null packets detected in the input transport packet stream, as indicated by the status signal from the null detector 30, are deleted. If the buffer is empty, then additional packets (either auxiliary or null packets) are inserted into the output packet stream. If the buffer is operating nominally, then neither of these actions are taken.

The equal rate signal indicates whether the bit rate of the output packet stream is substantially equal to that of the input packet stream. The response of the multiplexer control circuit 120 to this signal has been described above.

The multiplexer control circuit 120 generates the control signal for the MUX 20. This signal may be three binary signals: a first for conditioning the MUX 20 to couple an input transport packet from the input packet buffer 10 to the remodulation packet buffer 40; a second for conditioning the MUX 20 to couple an auxiliary data packet from the auxiliary packet generator 70 to the remodulation packet buffer 40; and a third for conditioning the MUX 20 to couple a null packet from the null packet generator 80 to the remodulation packet buffer 40. Alternatively, the control signal could be a two-bit binary encoded signal having a value which indicates which of the above actions is to be taken.

The multiplexer control circuit 120 may be designed and implemented as hardwired logic, either combinatorial or sequential, or as a software program executing on a microprocessor. One skilled in the art will understand how to design and implement such a control circuit 120 in either form.

The state machine 100 controls the overall operation of the remodulator illustrated in FIG. 1. One skilled in the art will understand the sequencing and the control signals required to properly time the operation of the remodulator illustrated in FIG. 1, and will understand how to design and implement a state machine 100 for generating those control signals.

Figure 3:
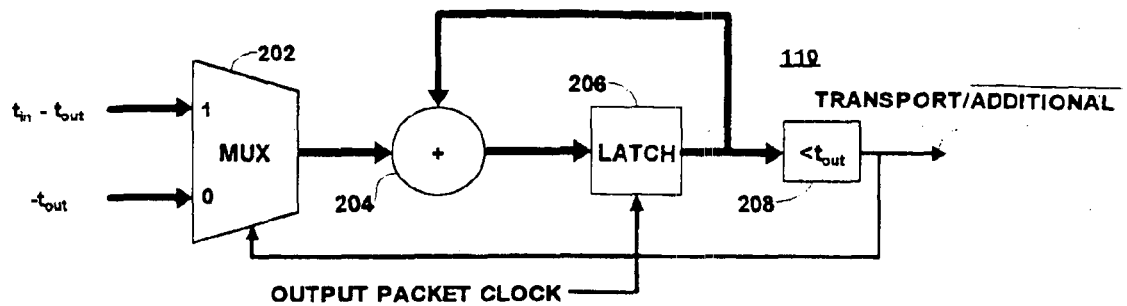
FIG. 3 is a more detailed block diagram of a numerically controlled oscillator which may be used in the system illustrated in FIG. 1.
Figure 4:
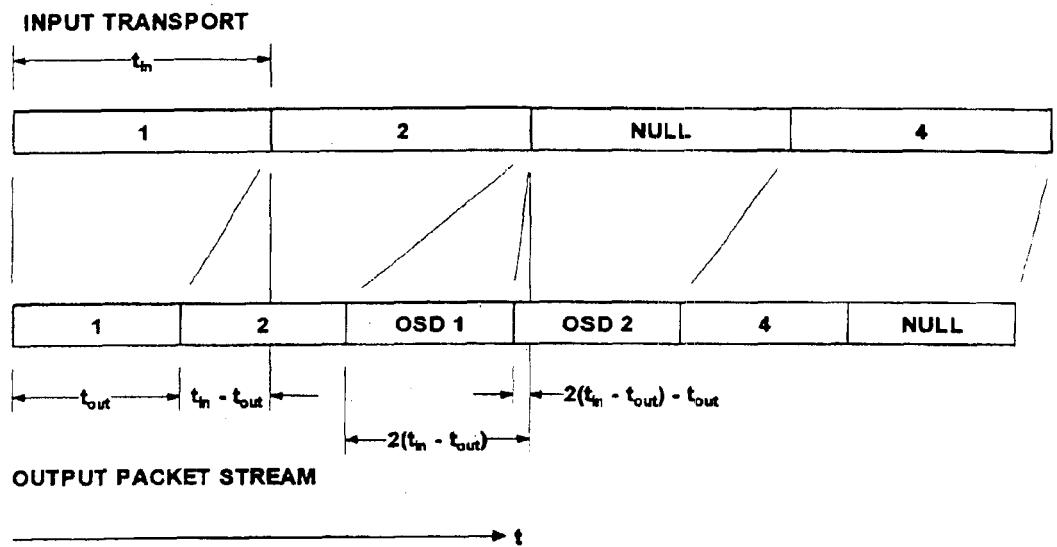
FIG. 4 is a timing diagram useful in understanding the operation of the numerically controlled oscillator illustrated in FIG. 3.

FIG. 3 is a more detailed block diagram of a numerically controlled oscillator 110 which may be used in the system illustrated in FIG. 1, and FIG. 4 is a timing diagram useful in understanding the operation of the numerically controlled oscillator 110 illustrated in FIG. 3. In FIG. 3, the lines represent digital signal carrying lines, and thicker lines represent multibit digital signals having more bits than thinner lines. In FIG. 3, a signal representing the difference in time duration between the input and output transport packets, $t_{in}-t_{out}$, is coupled to a first data input terminal of a multiplexer (MUX) 202. A signal representing the negative of the time duration of the output transport packet, $-t_{out}$, is coupled to a second data input terminal of the MUX 202. An output terminal of the MUX 202 is coupled to a first input terminal of an adder 204. An output terminal of the adder 204 is coupled to an input terminal of a latch 206. An output terminal of the latch 206 is coupled to a second input terminal of the adder 204. The latch 206 is clocked by the output packet clock signal. The combination of the adder 204 and latch 206 form an accumulator.

The output terminal of the latch 206 is also coupled to an input terminal of a comparator 208. An output terminal of the comparator 208 generates the transport/additional signal, described above, which is also coupled to a control input terminal of the MUX 202. The transport/additional signal has a logic '1' value at times when a packet from the input transport packet stream is to be inserted into the output packet stream, and a logic '0' value at times when an additional packet (auxiliary or null) is to be inserted into the output packet stream. This is further indicated by the horizontal line over "additional" in FIG. 3. The transport/additional signal is coupled to the multiplexer control circuit 120 (of FIG. 1).

In general operation, the value of the signal at the output of the latch 206 (i.e. the output of the accumulator) represents the amount of time the input transport packet stream is in advance of the output packet stream. While this value is less than the time duration of an output packet stream packet, then input transport packets must be inserted into the output packet stream because there is no time for an additional packet in the output packet stream. When, however, this value becomes greater than the time duration of an output packet stream packet, this indicates that there is time for an additional packet to be inserted into the output packet stream. When this occurs, the time duration of an output packet is subtracted from this value to make up for the additional packet inserted into the output packet stream and the operation continues, all as described in more detail below.

The comparator 208 compares the value of the signal from the latch 206 to a value representing the time duration of the output packet $t_{out}$. If the value of the latch 206 output signal is less than the value of the time duration of the output packet $t_{out}$, then the comparator 208 generates a logic '1' signal, indicating that an input transport packet is to be inserted into the output packet stream. If the value of the latch 206 output signal is greater than the value of the time duration of the output packet $t_{out}$, then the comparator 208 generates a logic '0' signal, indicating that an additional packet is to be inserted into the output packet stream.

Referring to FIG. 4, the starting time of the packet 1 in the input transport packet stream is temporally aligned with the starting time of packet 1 in the output packet stream. At this time, and under this condition, the value at the output terminal of the latch 206 is zero. This is less than the value of the time duration of the output packet $t_{out}$ and the comparator 208, thus, generates a logic '1' signal. This indicates that an input transport packet is to be inserted into the output packet stream, and conditions the multiplexer 202 to couple the time difference signal $t_{in}-t_{out}$ to the input of the adder 204, whose output now has the value of $t_{in}-t_{out}$.

The latch 206 is clocked at the ending time of output packet 1, and the latch 206 output signal becomes $t_{in}-t_{out}$. In the illustrated embodiment, this is still less than the time duration of the output packet $t_{out}$ so the output of the comparator 208 remains a logic '1' signal. The multiplexer 202, thus, continues to couple the time difference signal $t_{in}-t_{out}$ to the input of the adder 204, whose output now has the value of $2(t_{in}-t_{out})$.

The latch 206 is then clocked at the ending time of output packet 2, and the latch 206 output signal becomes $2(t_{in}-t_{out})$. In the illustrated embodiment, this is greater than the time duration of the output packet $t_{out}$. The comparator 208, thus, generates a logic '0' signal. This indicates that an additional packet is to be inserted into the output packet stream, and conditions the multiplexer 202 to couple the $-t_{out}$ signal to the input of the adder 204, whose output now has the value of $2(t_{in}-t_{out})-t_{out}$. This represents the time the input transport packet stream remains in advance of the output packet stream after the additional packet has been inserted into the output packet stream.

The latch 206 is clocked again at the ending time of the additional packet OSD1, and the latch 206 output signal becomes $2(t_{in}-t_{out})-t_{out}$. This is less than the time duration of the output packet $t_{out}$ so the output of the comparator 208 becomes a logic '1' signal. In response, the multiplexer 202 couples the time difference signal $t_{in}-t_{out}$ to the input of the adder 204, and an input transport packet is inserted into the output packet stream. The operation described above is repeated continually, inserting additional packets into the output packet stream when there is time enough to fit them in among the input transport packets. The circuit illustrated in FIG. 3 can operate for any time durations for the input and output packets. More specifically, these time durations do not have to be in an integer ratio.

Figure 5:
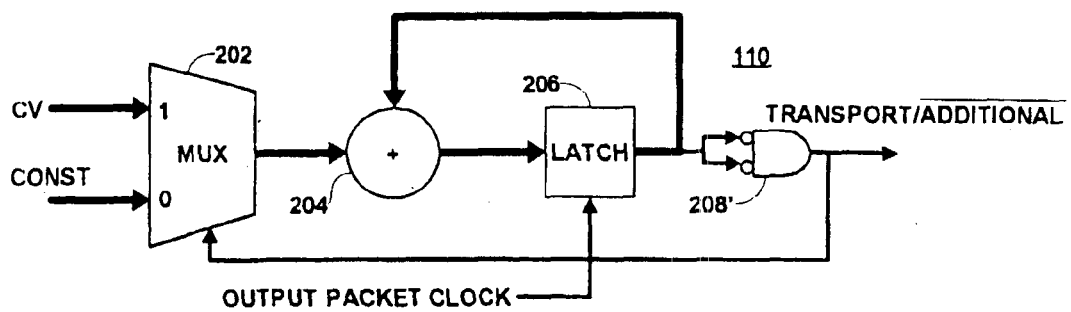
FIG. 5 is a more detailed block diagram of a practical embodiment of a numerically controlled oscillator corresponding to that illustrated in FIG. 3.

FIG. 5 is a more detailed block diagram of a practical embodiment of a numerically controlled oscillator 110 corresponding to that illustrated in FIG. 3. In FIG. 5, those elements which are the same as those illustrated in FIG. 3 are designated with the same reference numbers and are not described in detail below. In FIG. 5, two adjustments are made to the circuit illustrated in FIG. 3. First, numbers representing values are maintained as binary fixed point numbers having the bit format "SI.FFF . . . " where S represents a sign bit, I represents an integer bit and F represents fractional bits, all in a known manner. The accuracy with which the NCO 110 operates depends upon the size of these numbers. In a preferred embodiment these numbers are 24 bits in width.

Second, values of the various parameters are normalized to the time duration of the output packets $t_{out}$. That is, the time duration parameters are all expressed as fractions of an output packet time duration $t_{out}$. In addition, the packet time duration values are replaced by corresponding packet rate values, as described in more detail below. These adjustments make implementation of the NCO 110 easier to fabricate and more efficient to operate.

More specifically, the various parameters are normalized by dividing them by $t_{out}$ in a known manner. In addition, the $$CV = \frac{t_{in} - t_{out}}{t_{out}} \qquad (1)$$
$$= \frac{t_{in}}{t_{out}} - 1$$
$$= \frac{r_t}{r_v} - 1$$

packet time duration parameters are replaced by packet rate parameters: the input transport packet rate is designated rv, and equals $1/t_{in}$; the output packet rate is designated $r_t$ and equal $1/t_{out}$. Consequently, the time difference parameter $t_{in}-t_{out}$, coupled to the first input terminal of the multiplexer 202, is normalized to a control value CV as illustrated in equation (1). The control value CV is coupled to the NCO 110 from the state machine 100 (of FIG. 1).

The $t_{out}$ signal supplied to the second input terminal of the multiplexer 202 (of FIG. 3) is normalized to a value of –1, and the value compared in comparator 208 (of FIG. 3) is normalized to a value of 1. Because the comparator 208 (of FIG. 3) compares the value of the output signal of the latch 206 to 1, and because values are represented by fixed point binary numbers, the comparator 208 may be implemented by a two-input, negative input, AND gate 208', which is responsive to the most significant two bits (S and I) of the output of the latch 206, representing the sign and integer portion of the latch output value. The AND gate 208' generates a logic '1' signal when the value of both of these two bits is logic '0', indicating a value less than 1. If either of these bits is logic '1', indication a value greater than 1, then the AND gate 208' generates a logic '0' signal. The remainder of the circuit illustrated in FIG. 5 operates as described above with reference to FIG. 3.

Figure 6:
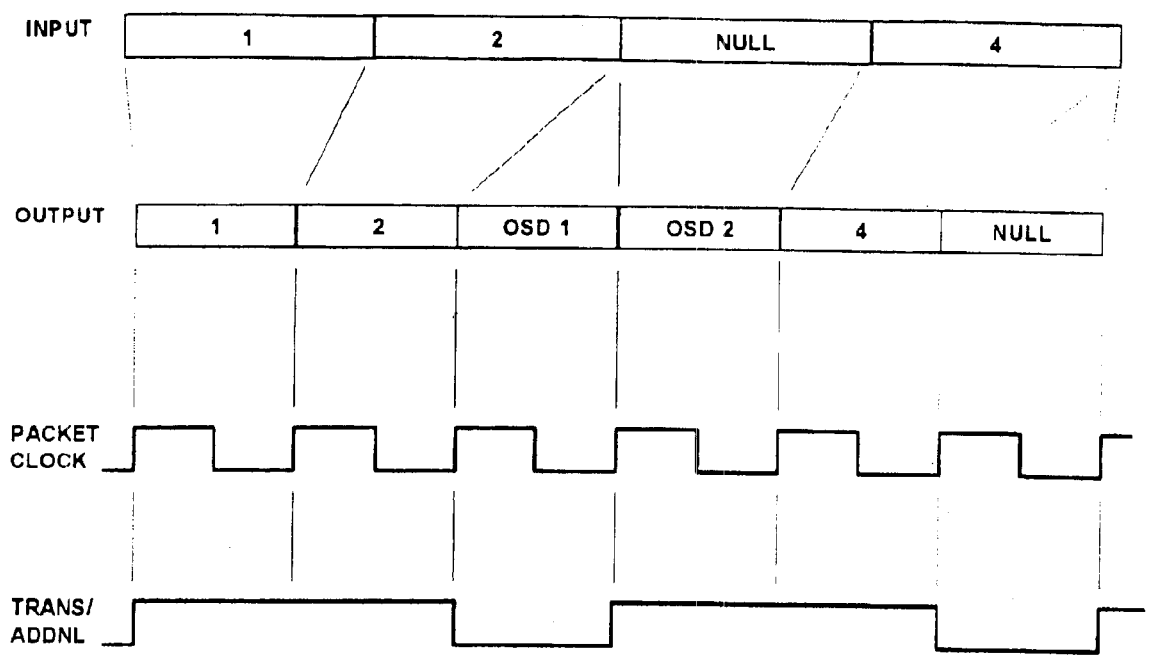
FIG. 6 is a timing diagram useful in understanding the operation of the numerically controlled oscillator illustrated in FIG. 5.

FIG. 6 is a timing diagram useful in understanding the operation of the numerically controlled oscillator illustrated in FIG. 5. In FIG. 6, the top two lines represent the input transport packet stream and corresponding output packet stream as illustrated in FIG. 2a. The third waveform represents the packet clock supplied to the multiplexer controller 120 from the oscillator 90. Each leading edge of the packet clock identifies the beginning of a packet slot in the output packet stream. At the beginning of each packet slot in the output packet stream (i.e. at the leading edge of the packet clock) the transport/additional signal is sampled. If it is a logic '1', then an input transport packet is inserted into the output packet stream. If it is a logic '0' an additional (auxiliary or null) packet is inserted into the output packet stream, all as described in more detail above.

The input datastream can exhibit a QPSK modulation format or a QAM (64-QAM or 256-QAM) modulation format, while the output datastream can exhibit a VSB modulation format (8-VSB or 16-VSB), for example. Other input/output modulation formats are possible.

What is claimed is:

1. In a remodulator system, apparatus for controlling the bit rate of an output packet stream, comprising:

a source of an input transport packet stream;

an input packet buffer, coupled to the input transport packet stream source, for generating a status signal indicating whether the input packet buffer is: full, empty, or neither empty nor full;

a control signal generator, responsive to the said status signal, and generating a control signal;

a variable output clock signal generator, responsive to said control signal; and an output packet stream generator coupled to said input packet buffer, and responsive to a variable output clock signal, for generating said output packet stream in synchronism with said variable output clock signal wherein the variable clock signal generator is responsive to the control signal for varying the frequency of the output clock signal; and the control signal generator comprises circuitry to generate the control signal to condition the variable output clock signal generator to increase its frequency if the status signal indicates that the input packet buffer is full, and decrease its frequency if the status signal indicates that the input packet buffer is empty.

2. The system of claim 1 wherein:

the input packet buffer generates the status signal further indicating whether the input packet buffer is: nearly full, or nearly empty;

the control signal generator further comprises circuitry to generate the control signal to condition the variable output clock signal generator to increase its frequency if the status signal indicates that the input packet buffer is nearly full, and decrease its frequency if the status signal indicates that the input packet buffer is nearly empty.

3. The system of claim 1 wherein:

the input transport packet stream contains null packets; and if the status signal indicates that the input packet buffer is full, null packets are deleted from the input transport packet buffer.

4. The system of claim 1 further comprising:

a source of additional packets; wherein:

the output packet stream generator comprises a multiplexer, coupled to the input transport packet stream source and the additional packet source, for combining packets from the input transport packet stream and additional packets to generate the output packet stream.

5. The system of claim 4 wherein if the status signal indicates that the input packet buffer is empty, an additional packet is inserted into the output packet stream.

6. The system of claim 4 wherein the source of additional packets comprises:

a source of packets representing auxiliary data; and a source of null packets; and the multiplexer inserts an auxiliary data packet into the output packet stream as an additional packet if an auxiliary data packet is available, and inserts a null packet into the output packet stream as an additional packet if an auxiliary data packet is not available.

7. In a remodulator system, a method for controlling the bit rate of an output packet stream, comprising the steps of:

providing a source of an input transport packet stream;

storing input packets from said source in an input packet buffer;

generating a status signal indicating whether the input packet buffer is; full, empty or neither empty nor full;

generating a control signal in response to said status signal;

generating a variable output clock signal in response to said control signal; and generating the output packet stream response to and in synchronism with said variable output clock signal wherein the frequency of the output clock signal varies in response to the control signal; and the variable output clock signal increases in frequency if the staus signal indicates that the input packet buffer is full, and decreases in frequency if the status signal indicates that the input packet buffer is empty.

8. The method of claim 7 wherein:

the status signal further indicates whether the input packet buffer is: nearly full, or nearly empty; and the control signal conditions the variable output clock signal to increase its frequency if the status signal indicates that the input packet buffer is nearly full, and decrease its frequency if the status signal indicates that the input packet buffer is nearly empty.

9. The method of claim 7 wherein:

the input packet stream format is compatible with one of a QAM or QPSK modulation format; and the output packet stream format is compatible with 8-VSB or 16-VSB modulation format.

10. The method of claim 7 wherein:

the source of input transport packet stream represents auxiliary on-screen display (OSD) information.

11. The method of claim 7 wherein:

the input packet stream format is compatible with one of a QAM, QPSK or VSB modulation formats; and the output packet stream format is compatible with a different one of said QAM, QPSK or VSB modulation formats.

* * * * *

UNITED STATES PATENT AND TRADEMARK OFFICE
CERTIFICATE OF CORRECTION

PATENT NO. : 6,888,840 B1  Page 1 of 1
DATED : May 3, 2005
INVENTOR(S) : Kumar Ramaswamy et al.

It is certified that error appears in the above-identified patent and that said Letters Patent is hereby corrected as shown below:

Title page,
Item [56], References Cited, OTHER PUBLICATIONS, the following reference should be shown -- Shoji Kitaori et al., Channel Coding Scheme for 3/4 in HDTV Digital VCR, Signal Processing: Image Communication 5 (1993), Elsevier Science Publishers B.V., SSDI 0923-5965 (93) E0031-X, pgs. 425-430. --.

Signed and Sealed this

Sixteenth Day of August, 2005

JON W. DUDAS
*Director of the United States Patent and Trademark Office*